Aug. 2, 1949.
H. S. LEE
2,477,756
TOP ICED REFRIGERATOR WITH THERMOSTATICALLY CONTROLLED AIR VALVE
Filed Sept. 13, 1946
2 Sheets-Sheet 1
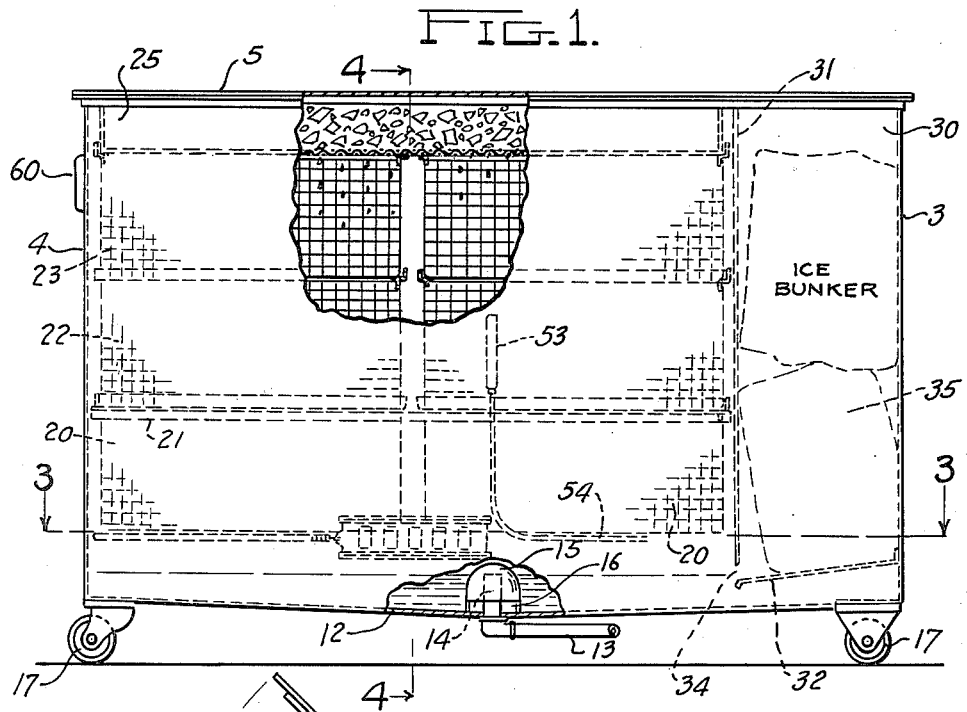
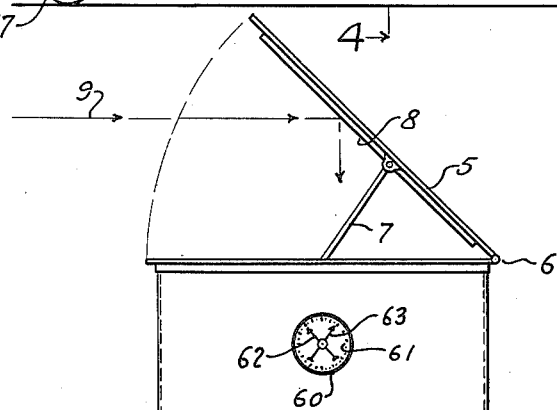
INVENTOR.
Harry S. Lee
BY
Barnes, Kisselle, Laughlin & Raisch
ATTORNEYS Aug. 2, 1949.   H. S. LEE   2,477,756
TOP ICED REFRIGERATOR WITH THERMOSTATICALLY
CONTROLLED AIR VALVE
Filed Sept. 13, 1946   2 Sheets-Sheet 2
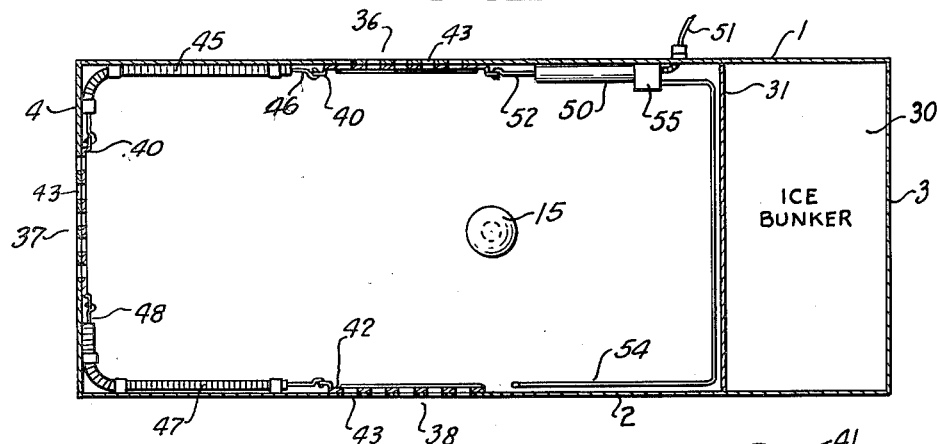
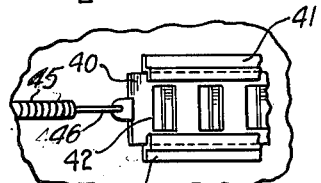
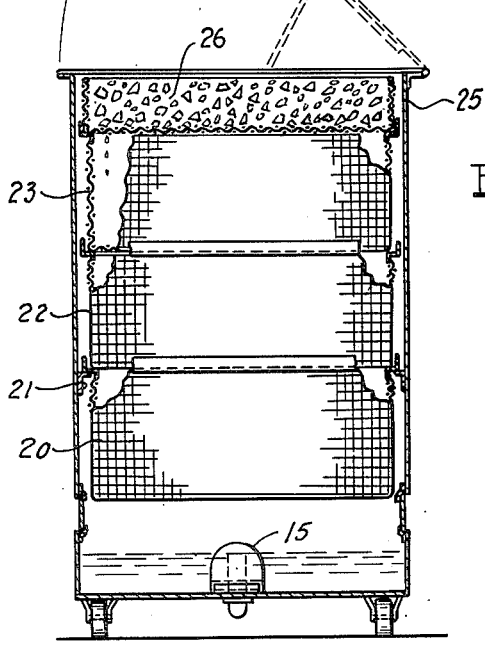
INVENTOR.
Harry S. Lee
BY
Barnes, Kisselle, Laughlin & Raisch
ATTORNEYS Patented Aug. 2, 1949

2,477,756

UNITED STATES PATENT OFFICE 2,477,756

TOP ICED REFRIGERATOR WITH THERMOSTATICALLY CONTROLLED AIR VALVE

Harry S. Lee, Franklin, Mich., assignor to Taylor-Winfield Corporation, Warren, Ohio, a corporation of Ohio Application September 13, 1946, Serial No. 698,898

4 Claims. (Cl. 62—2)

This invention relates to a fruit and vegetable storage device and to the method of storing the same.

A considerable problem is encountered by persons engaged in handling fruits and vegetables, such, for example, as retail stores, from the standpoint of preserving the produce for periods, such as overnight or over weekends, or holidays. Unless some care is taken the produce is liable to become unfresh, or stale, or completely spoiled to the point where the same is no longer salable. It is objectionable to place the fruits and vegetables in a refrigerator over the periods mentioned because the produce becomes at least partially dehydrated. Moreover the problem of bruising delicate fruits or vegetables is also encountered in that retail stores are, as a general thing, not equipped with means in which the fruits and vegetables may be stored. As a result the produce is often placed in bushel baskets or the like for such storage and unless care is taken, the more delicate items of produce may become bruised under the weight of or in contact with other items of produce such as heavy or rough articles of produce.

The general object of this invention is to provide a storage device in the nature of a cabinet for keeping the fruits and vegetables over the periods of time mentioned, or other periods for that matter, and for maintaining the same in a condition of freshness. To this end, an apparatus constructed in accordance with this invention is one arranged to maintain a condition of high humidity at an adequately low temperature. The humid condition preserves the moisture in the produce while the temperature is such that deterioration, which may result in an unfreshness or staleness is adequately deterred or prevented for the periods mentioned. The device of this invention is to be distinguished from the common conception of refrigeration. Advantageously, in carrying out the invention, ice is preferably used for the maintenance of both the temperature and the humid condition within the cabinet. The melting of the ice serves to reduce the temperature within the cabinet and the release of the water incident to melting aids in the maintenance of the humid condition. The control of the function is preferably accomplished by a simple expedient of governing the change of air in the cabinet, and this change of air likewise promotes the maintenance of the produce in a fresh condition because the air does not become stale. In this connection, a cabinet constructed in accordance with the invention is provided with suitable valve means which can be governed for throttling or for complete opening and closing for the entrance of ambient atmosphere into and out of the cabinet resulting in change of air therein and melting of the ice.

More specifically, the cabinet is one arranged to receive a suitable number of foraminous trays, each of which may be used to hold a particular fruit or vegetable or class of fruits or vegetables, and a suitable container, such as a foraminous tray, may be employed for containing chopped ice. The tray for the chopped ice is disposed uppermost in the cabinet as the ice melts the water therefrom drips downwardly over the produce. Preferably, the water collects in the bottom of the cabinet where the same is maintained at a suitable level thus facilitating the maintenance of a high humid condition. The cabinet need not necessarily be insulated as it is not a refrigerator, in the sense commonly conceived, and as distinguished from being closed to the outside atmosphere, the function thereof is governed by the controlled throttling of the passage of air into and out of the cabinet. A device constructed in accordance with the invention is shown in the accompanying drawings:

Fig. 1 is a side elevational view of a cabinet constructed in accordance with the invention with some parts cut away and some parts shown in dotted lines.

Fig. 2 is a side elevational view showing the top of the cabinet in open position.

Fig. 3 is a cross sectional view taken substantially on line 3—3 of Fig. 1 illustrating the air valves and a control therefor.

Fig. 4 is a sectional view taken substantially on line 4—4 of Fig. 1 illustrating interior construction.

Fig. 5 is a detailed view illustrating an air controlling valve.

As illustrated in Figs. 1 and 3, the cabinet may be and is shown as being rectangular in form with opposite side walls 1 and 2 and end walls 3 and 4. This cabinet is preferably constructed of sheet metal and as shown may not be insulated against the transference of heat through the walls thereof. There is a suitable cover for the top of the cabinet as shown at 5, the same being hinged at 6 and the cover may be equipped with a strut at 7 for holding it in an open position. As shown in Fig. 2, the under side of the cover may be equipped with a mirror 8. This facilitates use of the cabinet as a display device, in that the contents, at least in the upper portion thereof, may be seen by a customer through the means of the mirror, the sight line being demonstrated at 9.

The bottom of the cabinet is preferably formed so that portions thereof are inclined, the bottom being illustrated at 12 and at the lower portion is a suitable drain pipe 13. In order to maintain a level of water in the bottom of the container, the drain pipe 13 connects to a stand pipe 14, which may be covered by a ball type drain member 15, the water entering the ball through its lower portion as shown at 16. With this construction, the water level is maintained at the top of the stand pipe. The cabinet is preferably mounted on suitable rollers or casters 17 so that it may be manipulated and moved about.

The cabinet is arranged to receive a plurality of superposed baskets, as shown in Figs. 1 and 4. While the size of the cabinet may vary, as required, the one illustrated is arranged to receive two lower baskets 20. These baskets are arranged to rest upon one or more suitable supports 21 within the cabinet which may be in the form of angle iron baskets secured to the interior of the cabinet. Two intermediate baskets are shown at 22 and two upper baskets as at 23, and the baskets are arranged as indicated so that the bottom edge portion of one basket rests upon the upper edge portion of the one below it as shown. Thus, the interior of the cabinet is for the most part clear of obstructions.

These baskets are of foraminous material such as a suitable screening or of so-called expanded metal, and it is believed to be preferred that expanded metal be employed. An upper basket is illustrated at 25 and this is for containing a quantity of chopped ice as illustrated at 26. This basket may also rest upon the peripheral upper edge of the baskets 23. It will be appreciated that the several baskets are so constructed that they may be disposed at any location within the cabinet; that is to say, a basket may be placed in a lower position or an upper position. The basket 25 is also of foraminous material. As an additional feature, which, however, may or may not be employed in some instances, a compartment 30 may be provided within the cabinet as, for example, adjacent one end, and which constitutes an ice bunker. This compartment is defined by an interior wall 31 and a bottom wall 32 arranged to provide a drain passage 34 at the bottom. This bunker may receive blocks of ice as shown at 35. There may be times when the additional ice in the bunker is required, as for example, where extreme conditions are encountered, and there may be times when no additional ice is needed in the bunker.

In the lower portion of the cabinet, and positioned above the level of the water, are air valves or louvres arranged to permit of the entrance of air into the cabinet and for the flow of air out of the cabinet. As illustrated in Fig. 3, there is such an air valve in the wall 1 as generally shown at 36 and another one in the wall 4 as generally shown at 37, and a third one in the wall 2 as generally shown at 38. Various means can be employed for governing the openings, for example, as illustrated in Fig. 5 where the valving member is in the form of a slide 40 mounted in suitable guides 41 and provided with openings 42 arranged to be brought into and out of registry with cooperating openings 43 in the walls. Suitable means are provided for interconnecting the valving members for operation in unison and as shown herein, two Bowden wires are used. The Bowden wire 45 has its casing mounted inside the cabinet and its actuating wire 46 connected to the valving members 40 of the valves 36 and 37. The Bowden wire 47 has its casing secured to the inside of the cabinet with its actuating wire 48 connected to the valving members of the valves 37 and 38. The operation of a Bowden wire is well understood and upon shift of one of the slide valve members, the others are similarly shifted.

If the cabinet is in use during the time when one or more attendants are available, the valves may be manually operated. However, suitable automatic means may comprise an electric actuator 50 supplied with current as by means of lead lines 51, the actuator being connected to one of the slides by means of an armature 52. A thermostatic element 53 is suitably located within the cabinet. This thermostatic element may be of the type containing an expansible fluid and which is connected by means of a small tube 54 to a pressure operated switch 55 for causing operation of the actuator 50. The cabinet is also preferably provided with indicating means for showing the temperature and the humidity within the cabinet. This may be in the form of a single instrument 60 mounted on a wall of the cabinet and provided with suitable indicia 61 which functions in conjunction with indicators or pointers 62 and 63, one of which is a thermometer for showing the temperature and the other of which is a hygrometer for showing the humidity. The sensitive elements of this instrument would, of course, be subjected to conditions within the cabinet. This instrument may be used for the manual control of the air valves.

In the use of the device, the various kinds and classes of fruits and vegetables may be disposed within containers and placed within the cabinet. By separating the items of produce, as by putting one class of produce in one basket and another class of produce in another basket, bruising is largely prevented and the underlying items of produce are not subjected to excess weight. A suitable amount of chopped ice is placed in the basket 25 and then the cover closed. Blocks of ice may be placed in the bunker as required. The thermostat for controlling the louvres is set to maintain an appropriate temperature and it is believed that a temperature of about 55° F. is a desirable temperature to maintain. This, of course, will vary as the device operates, but a temperature in about this range has been found to be adequate. This temperature, of course, is far above what is generally conceived to be a suitable temperature for refrigeration. As the ice in the basket 25 melts the water drips downwardly over the contents in the baskets and collects in the bottom of the container where it is maintained at the level indicated. This condition promotes high humidity within the cabinet.

When the cabinet is closed and with the louvres or air valves closed, the temperature within the cabinet will fall. When the temperature is suitably lowered, the automatic control for the air valves or louvres will operate to open the louvres to the position shown in Fig. 3. Now, inasmuch as the chopped ice is in the top of the cabinet the air chilled thereby will move downwardly in the cabinet. Some of this air will pass out through the open louvres. Other ambient air from the outside of the cabinet will move in through the louvres and upwardly to replace the cold air which has moved downwardly. The incoming air will wipe the surface of the water so that its moisture content is elevated and since the incoming air is warmer than the air already in the cabinet, melting of the ice is promoted. This increases the volume of water dripping from the chopped ice over and through the items of produce in the basket, thus maintaining high humidity. The warmer incoming air raises the temperature within the cabinet and when the temperature has been elevated to a point determined by the thermostatic control the louvres are closed. Accordingly, the cycle continues with the temperature within the cabinet lowering.

Now, it will be observed that there is no particular means provided to force a draft of air. In other words, the incoming and outgoing air are not necessarily separately confined in ducts as it is not desired to create or set up a draft of air over the produce in the cabinet. To the contrary, there is a mild circulation of the air due to convection currents. It is believed to be desirable that the air valves be of such size and proportion that when they are open, a substantially complete change of air within the compartment may take place in a relatively short time. This is to promote a change of air in the compartment so that there is no trapped air to become stale. When the louvres are closed and the temperature is lowering the humidity within the chamber is probably rising. When the louvres open and the temperature within the compartment is rising due to the incoming air, the humidity of the air within the cabinet if the ambient air is dry, probably lowers somewhat. However, the warmer air promotes melting of the ice thus establishing a condition for maintaining high humidity and it is believed to be preferable that the air within the cabinet be substantially saturated.

As pointed out above when extreme high temperatures are encountered, additional ice may be used in the bunker. On the other hand, bunker ice may be employed when the produce is to be stored over a lengthy period. There are times, however, when the device may be employed using only the chopped ice in the tray 25.

I claim:

1. A storage device for produce such as fruits and vegetables comprising, a cabinet, a plurality of containers removably mounted in the cabinet in superimposed relationship each for holding items of produce, another container removably mounted in the cabinet above and substantially completely overlying said plurality of containers and adapted to hold a quantity of chopped ice, said containers comprising foraminous material whereby water from the melting ice drips through the produce, air valve means in the lower portion of the cabinet and temperature sensitive control means for opening the air valve means upon the lowering of the temperature in the cabinet for the entrance of ambient atmosphere and circulation of the same in the cabinet by convection and for closing the air valve means upon a rise of the temperature in the cabinet.

2. A storage device for produce such as fruits and vegetables comprising, a cabinet having an open top, a closure therefor, a plurality of containers removably mounted in the cabinet in superimposed relationship each for holding items of produce, another container removably mounted in the cabinet above and substantially completely overlying said plurality of containers and adapted to hold chopped ice, said containers comprising foraminous material so that water from the melting ice drips through the articles of produce, means in the cabinet for maintaining a quantity of water in the lower portion of the cabinet and for draining excess water, air valve means in the lower portion of the cabinet above the level of the water and temperature sensitive control means in the cabinet for opening the air valve means upon lowering of the temperature in the cabinet for the entrance of ambient atmosphere to effect a change in the cabinet and for closing the air valve means upon a rise of temperature in the cabinet, whereby the air in the cabinet is maintained at a high relative humidity and controlled temperature.

3. A storage device for produce such as fruits and vegetables comprising, a cabinet having an open top, an openable closure therefor, a plurality of containers removably mounted in the cabinet in superimposed relationship and each adapted to receive items of produce, another container removably positioned above said plurality of containers and substantially overlying said other containers, said containers comprising foraminous material so that water from the melting ice drips through the articles of produce, means in the cabinet for maintaining a quantity of water in the lower portion of the cabinet and for draining excess water, air valve means in the lower portion of the cabinet and temperature sensitive control means for opening the air valve means upon a lowering of temperature in the cabinet and for closing the air valve means upon a raising of the temperature in the cabinet, whereby the air in the cabinet is changed when the valve means are opened so that a temperature controlled fresh air condition of high humidity is maintained in the cabinet.

4. A storage device for produce such as fruits and vegetables comprising, a cabinet having an open top, a openable closure therefor, a plurality of containers removably mounted in the cabinet in superimposed relationship and each adapted to receive items of produce, another container removably positioned above said plurality of containers and substantially overlying said other containers, said containers comprising foraminous material so that water from the melting ice drips through the articles of produce, means in the cabinet for maintaining a quantity of water in the lower portion of the cabinet and for draining excess water, air valve means in the lower portion of the cabinet, temperature sensitive control means for opening the air valve means upon a lowering of temperature in the cabinet and for closing the air valve means upon a raising of the temperature in the cabinet, whereby the air in the cabinet is changed when the valve means are opened so that a temperature controlled fresh air condition of high humidity is maintained in the cabinet, and an ice bunker compartment in the cabinet for holding an added supply of ice.

HARRY SWADNER LEE.

REFERENCES CITED

The following references are of record in the file of this patent:

UNITED STATES PATENTS

| Number | Name | Date |
| --- | --- | --- |
| 1,465,657 | Vacatos | Aug. 21, 1923 |
| 2,055,158 | Rice | Sept. 22, 1936 |
| 2,069,149 | Hokanson | Jan. 26, 1937 |
| 2,113,344 | Grubb | Apr. 5, 1938 |
| 2,183,868 | Kavan | Dec. 19, 1939 |
| 2,242,407 | Tobey | May 20, 1941 |